United States Patent [19]

FitzGerald et al.

[11] Patent Number: 5,420,594
[45] Date of Patent: May 30, 1995

[54] MULTI-MODE POSITION LOCATION METHOD

[75] Inventors: Mark R. FitzGerald, Phoenix; Craig T. Griffin, Chandler; Glen E. Sater, Phoenix, all of Ariz.

[73] Assignee: Motorola, Inc., Schaumburg, Ill.

[21] Appl. No.: 139,137

[22] Filed: Oct. 21, 1993

[51] Int. Cl.⁶ .......................... G01S 5/02; H04B 7/19; G01C 21/00
[52] U.S. Cl. ................................. 342/357; 364/449
[58] Field of Search .............. 342/357, 353, 457, 358; 455/12.1; 364/449

[56] References Cited

U.S. PATENT DOCUMENTS

| | | | |
|---|---|---|---|
| 4,229,737 | 10/1980 | Heldwein et al. | 343/6 R |
| 4,445,118 | 4/1984 | Taylor et al. | 343/357 |
| 4,652,884 | 3/1987 | Starker | 342/357 |
| 4,682,953 | 7/1987 | Doerfel et al. | 434/16 |
| 4,744,761 | 5/1988 | Doerfel et al. | 434/16 |
| 4,812,991 | 3/1989 | Hatch | 364/458 |
| 4,976,619 | 12/1990 | Carlson | 434/16 |
| 5,228,854 | 7/1993 | Eldridge | 434/11 |
| 5,257,195 | 10/1993 | Hirata | 364/449 |
| 5,292,254 | 3/1994 | Miller et al. | 434/11 |
| 5,365,447 | 11/1994 | Dennis | 364/449 |

*Primary Examiner*—Thomas H. Tarcza
*Assistant Examiner*—Dao L. Phan
*Attorney, Agent, or Firm*—Frank J. Bogacz

[57] ABSTRACT

A multi-mode position location method detects the location of movable detection devices which are attached to movable carriers in a simulated battlefield. The multi-mode position location method employs three modes of position location of the detection devices. The first mode is a Global Positioning System (GPS) differentially corrected position of the detection device. The second mode is a multilateration determined position of the detection device. The third mode is an autonomously determined GPS position of the detection device. The autonomously determined position is determined without any differential GPS corrections. The most accurately determined position of the detection device may be used for area weapons effects simulation and carrier tracking by transmitting the carrier's position to a master control station.

20 Claims, 3 Drawing Sheets

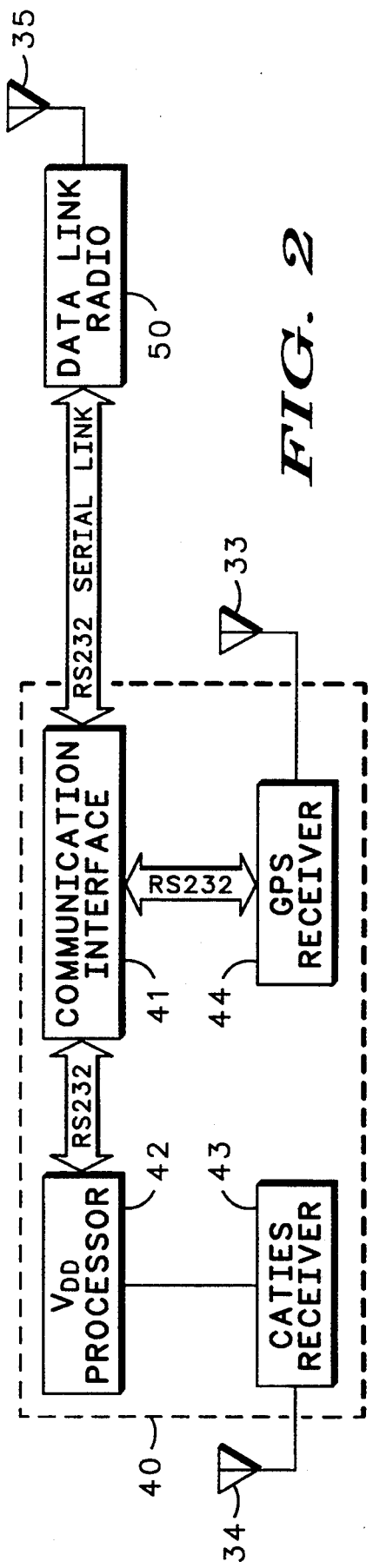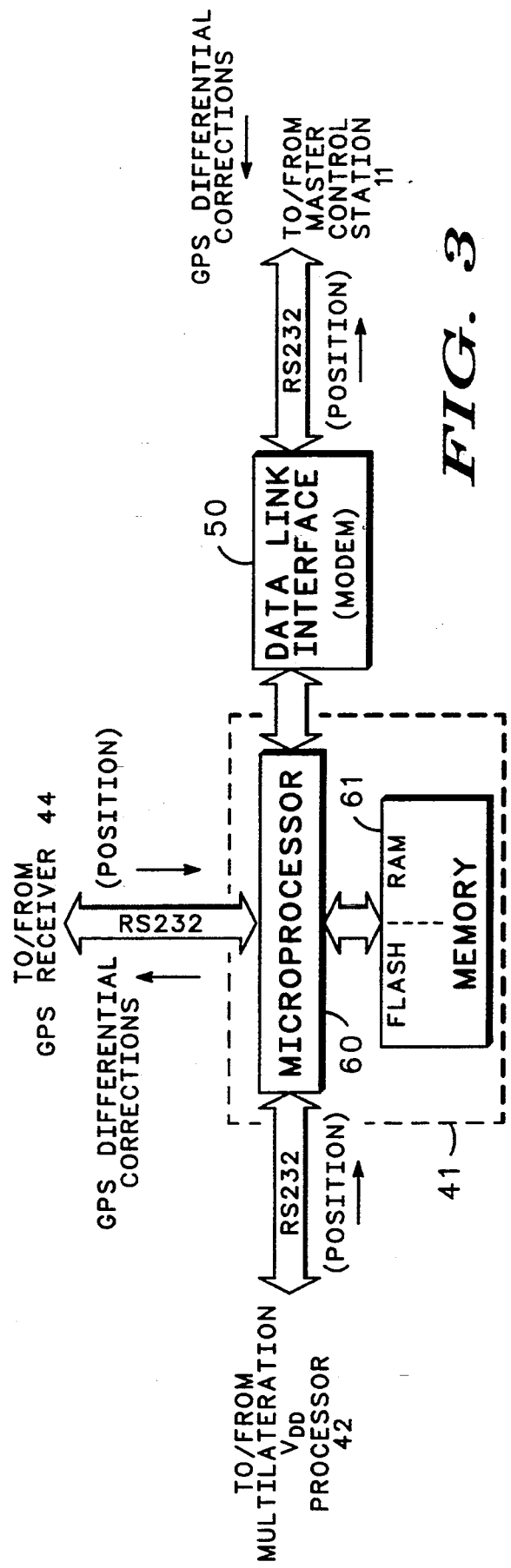

MULTI-MODE POSITION LOCATION METHOD

BACKGROUND OF THE INVENTION

The present invention pertains to the location of detection device carriers within a bounded area and more particularly to a multi-mode position location method for providing accurate positions of detection devices within a simulated battlefield.

Currently, to locate troops and vehicles within a simulated battlefield, multilateration systems exist to provide such information. Multilateration systems provide a certain level of accuracy in their position determination. However, since such systems are highly dependent upon the moving vehicles or soldiers to receive signals from stationary relays or transmitters, uneven terrain and foliage may interfere with the ability for position location determination by the moving of troops and vehicles.

Global Positioning System (GPS) is able to provide highly accurate position location determination. However, modes of high resolution GPS position determination are or may be unavailable for general usage. The Department of Defense intentionally "dithers" the signals transmitted by GPS satellites since extremely accurate position location may be used for illegal purposes.

Further, the GPS system may be unavailable sometimes for use due to satellite failure. In addition, the transmission relays of multilateration systems may fail also.

Therefore, in order to avoid the high cost of amassed troops and vehicles which are unable to perform in "war game" exercises, a highly reliable and accurate position location system would be advantageous.

SUMMARY OF THE INVENTION

In accordance with the present invention, a novel multi-mode position location method for locating detection devices first determines by a processor whether the Global Positioning System (GPS) position is valid for a particular detection device. Next, if the GPS position of the detection device is valid, the processor provides a differentially corrected GPS position of the detection device to a master control station.

Then, if the Global Positioning System position of the detection device is not valid, the processor determines whether a multilateration system position of the detection device is valid. If the multilateration system position of the detection device is valid, the processor provides this position to the master control station in place of the Global Positioning System position.

BRIEF DESCRIPTION OF THE DRAWINGS

FIG. 2 is a block diagram of a vehicle detection device in accordance with the present invention.

FIG. 3 is a block diagram of a communication interface of FIG. 2 in accordance with the present invention.

DESCRIPTION OF THE PREFERRED EMBODIMENT

Figure 1:
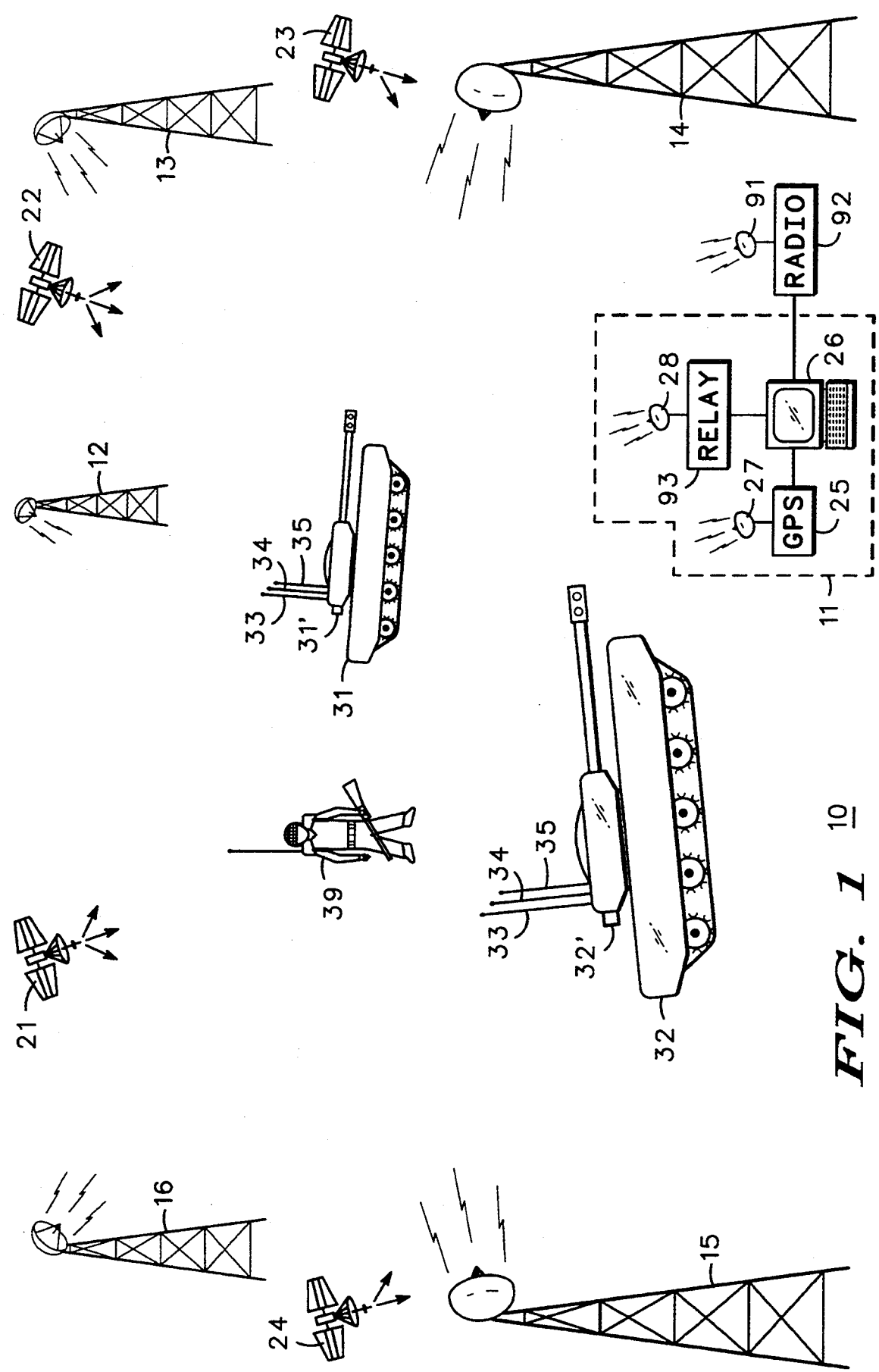
FIG. 1 is multi-mode position location system in accordance with the present invention.

FIG. 1 depicts a simulated (war game) battlefield 10. The battlefield 10 includes a mission control station 11 including GPS receiver 25 and its corresponding antenna 27 which are coupled to computer 26. Computer 26 is coupled to a relay 93 and to an antenna 28 for transmitting to relays 12–16. Computer 26 is also coupled to relay 93 which includes radio 92 which is coupled to antenna 91. Radio 92 transmits and receives data communications from vehicles 31 and 32 through antenna 91. Also included is a number of GPS satellites 21–24 which are part of the NAVSTAR Global Positioning System (GPS). Also depicted in the battlefield are tanks 31 and 32. Although tanks 31 and 32 are shown, any type of vehicle or person 39 (e.g. soldier) may be tracked with the positioning method. Each vehicle 31 and 32 includes a vehicle detection device 31' and 32' for determining the position of the vehicle. The vehicle detection device 31' and 32' also transmit this information back to the master control station 11. Antennas 33–35 are coupled to the respective vehicle detection devices 31' or 32'. Antenna 33 receives GPS information for determining its position from satellites 21 through 24. Antenna 34 of each vehicle detection receives information from relays 12–16. VDDs 31' and 32' use this information for self-positioning determination with Multilateration techniques. One such system for Multilateration techniques is the CATIES system manufactured by Motorola, Inc. Antenna 35 of each vehicle detection device 31' and 32' is an antenna for transmitting position information of each vehicle back to mission control station 11 via antenna 91 and radio 92 to computer 26.

Mission control station 11 transmits messages via antenna 28 to each of the relays (actuators) 12–16 so that the actuators may rebroadcast the information over battlefield 10. When the VDDs 31' and 32' receive this information, they perform Multilateration methods to self-determine the location within the battlefield of the vehicle to which they are attached. Mission control station 11 also receives GPS information from satellites 21–24 via antenna 27 and GPS receiver 25. Receiver 25 calculates GPS pseudorange errors and transmits this information to computer 26 for transmission to VDDs 31' and 32' as differential GPS information to be used by the VDDs. Antenna 35 of each VDD 31' and 32' transmits the position of each vehicle back to the master control station 11 for appropriate usage.

Each of the relays 12–16 synchronizes its transmission with a fixed time delay with respect to one another. Therefore, the VDDs 31' and 32' may use three or more of the relays for accurately determining its position. The greater the number of transmitting relays 12–16, the greater likelihood that the vehicle detection device will receive more accurate position location information and be able to better process the information to eliminate erroneous solutions to the Multilateration detection methodology.

FIG. 2 depicts a block diagram of a vehicle detection device 31', 32' as shown in FIG. 1. Vehicle detection device 40 includes a Multilateration receiver 43 (CATIES receiver) coupled to a VDD processor 42. VDD processor 42 is coupled via an RS232 link to communication interface 41. Vehicle detection device 40 also includes GPS receiver 44 which is coupled to communication interface 41 via an RS232 link. In addition, vehicle detection device 40 includes data link 50 which is coupled to communication interface 41 via an RS232 serial link. Antenna 34 is connected to CATIES receiver 43. GPS antenna 33 is connected to GPS receiver 44. Data link transmission antenna 35 is connected to data link radio 50.

Antenna 34 receives messages from relays 12-16. CATIES receiver 43 removes these messages and transmits the information to VDD processor 42. VDD processor 42 performs a multilateration process in order to determine the location of the vehicle to which the VDD is attached. VDD processor 42 transmits the position location information via an RS232 link to communication interface 41.

GPS antenna 33 receives position information from GPS satellites 21-24. This information is transmitted from antenna 33 to GPS receiver 44. GPS receiver 44 calculates the position of the vehicle from the information contained in the satellite transmissions.

Communication interface 41 transmits the position of its associated vehicle through RS232 serial link to data link 50. Data link radio 50 includes a modem for transmitting the position information via antenna 35 to master control station 11.

FIG. 3 depicts a block diagram of communication interface 41. Communication interface 41 includes microprocessor 60 which is connected to memory 61. Memory 61 includes a "flash" memory which is capable of being programmed electronically and reprogrammed and a random access memory (RAM). The flash memory stores the operating program for microprocessor 60. The RAM memory stores intermediate data for calculation and communication.

VDD processor 42 transmits a multilateration position of the location of the vehicle to microprocessor 60. VDD processor 42 transmits the position every 2 seconds. Microprocessor 60 is also coupled to GPS receiver 44 for receiving position information from the GPS receiver. GPS receiver 44 will transmit either a position calculated using a differential correction factor or a position calculated autonomously by the GPS receiver without the aid of any correction. Differentially-corrected GPS is the most accurate form. Data link radio 50 is coupled to microprocessor 60. Data link radio 50 receives differential GPS corrections from master station 11 and transmits these corrections to microprocessor 60. Microprocessor 60 transmits these differential corrections to the GPS receiver 44 and in turn receives differentially-corrected GPS position. GPS receiver 44 typically transmits either differentially corrected position or autonomously-calculated position approximately every second to microprocessor 60. Differential GPS provides the most accurate position location. Multilateration systems are the next most accurate with an autonomous GPS being the least accurate system. Refer to Table 1 which depicts the various methods mentioned above and their respective accuracies for determining location of a vehicle.

TABLE 1

| Method | Positioning Accuracy Accuracy |
| --- | --- |
| 1. Differential GPS: | |
|    2 sec. updates | 5 meters |
|    20 sec. updates | 25 meters |
| 2. CATIES Mutilateration | 16 meters |
| 3. Autonomous GPS (PDOP ≦ 4.0): | |
|    Sel. Avail. OFF | 25 meters |
|    Sel. Avail. ON | 100 meters |

Note that for the first method, differential GPS, if correction updates are received every 2 seconds, the accuracy will be within 5 meters whereas if updates are received every 20 seconds, the accuracy will drop to 25 meters. Multilateration systems such as the CATIES system provide an accuracy of about 16 meters. Any specification of the accuracy of a GPS system always carry the caveat that measurements are subject to selective availability (SA) and positional dilution of precision (PDOP). In order to prevent an unauthorized persons from using GPS for hostile activities, the U.S. Department of Defense has implemented selective availability, the deliberate degradation of GPS accuracy receivers of the C/A code. The result is a limitation of GPS accuracy to about 100 meters. Differentially-corrected GPS can remove these inaccuracies by measuring the errors at a known site, the mission control station 11. These corrections are then sent to microprocessor 60 via data link 50 on a regular basis. Positional dilution of precision is a scaler multiplying factor used to quantify the effects of satellite geometry for GPS accuracy. For example, the average position error will be twice as large when the PDOP is 8 as when the PDOP is 4. Throughout the transmitting day of the GPS satellites, there are usually many periods when the PDOP is high enough to create errors of hundreds of meters even with the selective availability OFF. Further, factors such as terrain blockage or antenna orientation can force the GPS receiver to use less than the optimum combination of satellites or even force the GPS receiver to operate in the two-dimensional mode. For such occurrences, the multilateration system is used in place of the differential GPS system. Since it is very expensive to put together a "war game" in terms of personnel and vehicles and time and equipment, switching to another position location system may prevent the entire war game from being a useless exercise.

Figure 4:
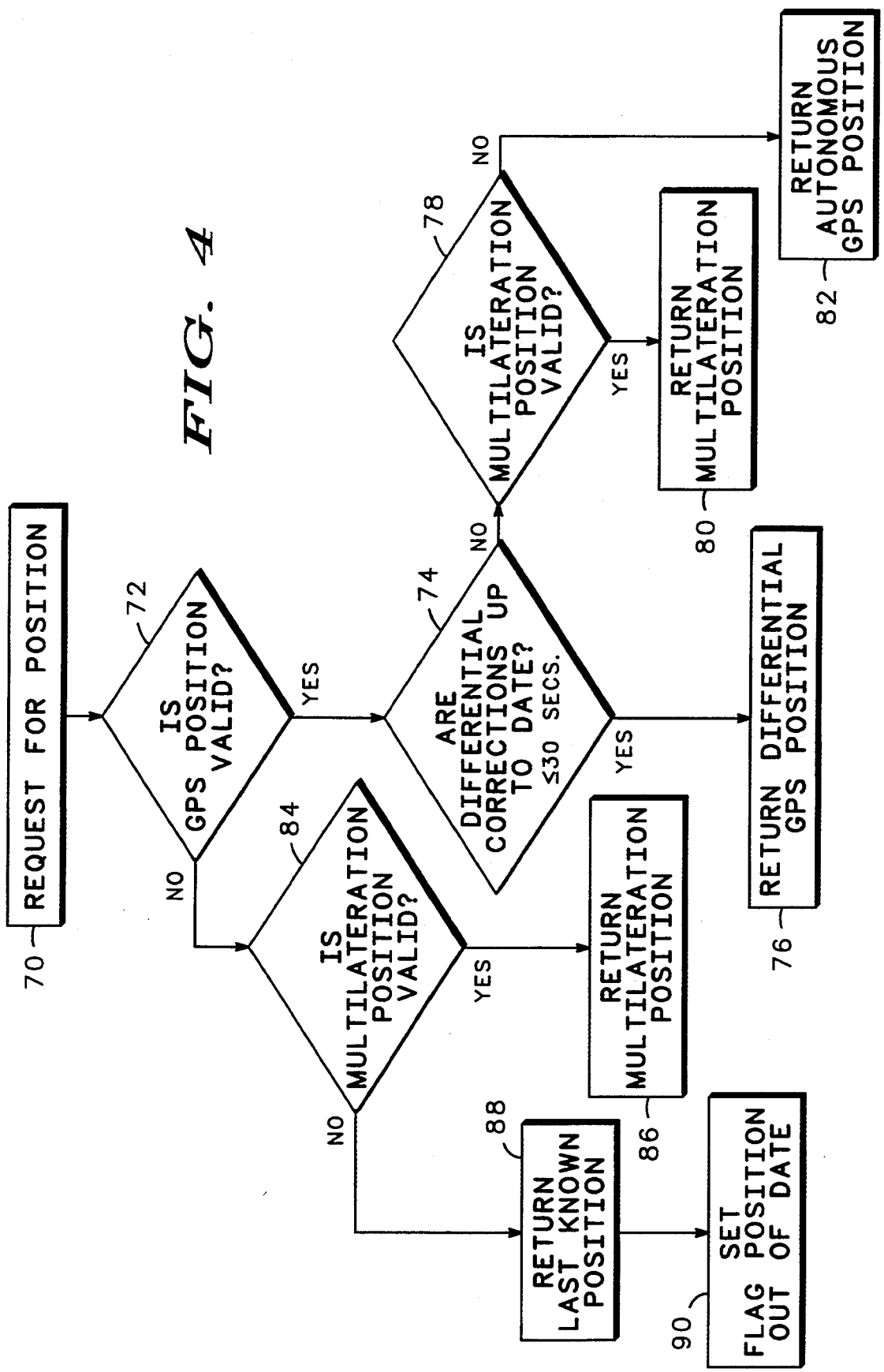
FIG. 4 is a flow chart of the multi-mode position location method in accordance with the present invention.

Referring to FIG. 4, the multi-mode position location method is shown. The operating program comprising this memory is stored in the flash portion of memory 61 and is performed by microprocessor 60. The first step of the method is a request for position of a particular vehicle. Each vehicle detection device such as 31' and 32' self-determine their position. The vehicle detection device may periodically or on demand of the mission control station 11 report its position. Block 70 receives this request for position. Next, the method determines whether the GPS position is valid, block 72. GPS receiver 44 sets a flag which is transmitted to RAM memory of memory 61 to indicate that the present GPS location output by GPS receiver 44 is valid. To be valid, GPS receiver 44 must be tracking a sufficient number of satellites, typically at least four. In addition, the geometry of these satellites must be above a certain threshold. The ideal positioning would be one GPS satellite in each quadrant of the sky. Situations in which the GPS satellites appear in a single quadrant will provide an inaccurate position. Therefore, if the flag indicates the GPS position is valid, block 72 transfers control to block 74 via the Y path. Block 74 determines whether the differential GPS corrections are up-to-date. As previously mentioned, master control station 11 transmits differential GPS corrections periodically through data link radio 50, through microprocessor 60 to GPS receiver 44. GPS receiver 44 corrects its GPS calculated position to include the differential correction. GPS receiver 44 then outputs this corrected position to microprocessor 60. If differential GPS corrections have been made within a period less than or equal to 30 seconds, the corrections are considered to be upto-date and block 74 transfers control to block 76 via the Y path. Block 76 gathers the differential GPS position output by receiver 44, formats and transmits this information through data link radio 50 to master control station 11. Master control station 11 is set up to display the location of each particular vehicle.

If the differential corrections were not up-to-date, block 74 transfers control to block 78 via the N path. Block 78 determines whether the multilateration position location system is valid. That is, processor 60 checks to determine that the system is on-line and operational and that its position outputs are up-to-date. For a multilateration position to be up-to-date, it must have been determined within the last 20 seconds. So, if the multilateration position is operational and up-to-date, position calculated within the last 20 seconds, block 78 transfers control to block 80 via the Y path. Block 80 gathers the multilateration position, formats and transmits this position through data link radio 50 to master station 11. If the multilateration position is either unavailable or not up-to-date, block 78 transfers control to block 82 via the N path. Block 82 gathers the autonomous GPS position which has been output by GPS receiver 44, formats and transmits this position information through data link 50 to the master control station 11. GPS receiver 44 outputs the autonomous GPS location for time periods for which it has not received GPS differential corrections for time periods greater than 60 seconds. Between 30 seconds and 60 seconds, GPS receiver 44 still outputs differentially-corrected GPS position, however, this position information is not as accurate the under 30 second up-dated differentially corrected GPS location.

If the GPS position location information is not valid, block 72 transfers control to block 84 via the N path. Block 84 determines whether the multilateration system position is valid. This is similar to that performed by block 78. To be valid the multilateration position system must be operational and the positions up-to-date. For an up-to-date position, the position must have been calculated within the previous 20 seconds. If the multilateration position is valid, block 84 transfers control to block 86 via the Y path. Block 86 gathers, formats, and transmits the multilateration position through data link radio 50 to master control station 11. If the multilateration position is not valid, block 84 transfers control to block 90 via the N path. Block 90 gathers, formats, and transmits the last known position through data link radio 50 to master control station 11. The resultant method has the advantage of allowing "war game" exercises to continue even though one of the positioning systems may have a significant failure. One example would be a satellite failure in the global positioning system. Another example might be a failure of one of the relay stations of the multilateration system. Secondly, the multi-mode position location method allows for "war game" exercises to continue during periods of no coverage by one or the other of the systems. That is, the GPS system have a lack of sufficient number or geometry of satellites or the multilateration system may provide no coverage due to terrain features adherent in such systems. Lastly, this method provides the advantage of selecting the position location system which currently provides the most accurate position. Therefore, the position of each vehicle may be tracked in a highly reliable fashion by the master control station. The result is an accurately tracked "war games" exercise. In addition this invention is useful for area weapons effects simulation and carrier (vehicle or person) tracking by transmitting the carrier's position to a master control station.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A multi-mode position location method for a detection device comprising the steps of:
   first determining by a processor whether a Global Positioning System (GPS) position of the detection device is valid;
   first providing by the processor a differential corrected GPS position of the detection device to a master control station;
   second determining by the processor whether a multilateration system position of the detection device is valid, if the GPS position is not valid; and
   second providing by the processor a multilateration system position of the detection device to the master control station, if the multilateration system position is valid.

2. A multi-mode position location method as claimed in claim 1, wherein there is further included the step of requesting by the master control station a position of the detection device.

3. A multi-mode position location method as claimed in claim 2, wherein said step of requesting includes the step of periodically requesting the position of the detection device by the master control station.

4. A multi-mode position location method as claimed in claim 2, wherein said step of requesting includes the step of requesting on demand by the master control station the location of the detection device.

5. A multi-mode position location method as claimed in claim 2, wherein the step of first determining includes the steps of:
   determining by a GPS receiver that the GPS receiver is tracking a sufficient number of satellites to produce a valid GPS position location; and
   determining by the GPS receiver that the geometry of the satellites is above a threshold to provide a valid GPS position location by the GPS receiver.

6. A multi-mode position location method as claimed in claim 5, wherein the step of second determining includes the steps of:
   providing by the master control station differential GPS position corrections to the processor, the processor transmitting the differential GPS position corrections to the GPS receiver; and
   third determining by the processor that the differential GPS position corrections are less than or equal to 30 seconds old.

7. A multi-mode position location method as claimed in claim 6, wherein there is further included the step of fourth determining by the processor whether the multilateration system position of the detector device is valid, if the GPS position of the detector device is not valid.

8. A multi-mode position location method as claimed in claim 7, wherein there is further included the steps of:
   the step of fourth determining includes the steps of:
   checking by the processor that the multilateration system position of the detection device has been calculated within the preceding 20 seconds; and transmitting by the processor to the master control station the multilateration system position of the detection device, if the multilateration system position was calculated within the preceding 20 seconds.

9. A multi-mode position location method as claimed in claim 7, wherein there is further included the step of transmitting by the processor to the master control station an autonomous GPS position, if the multilateration system position of the detection device is not valid, said autonomous GPS position being a GPS position of the detection device without the differential GPS position corrections.

10. A multi-mode position location method as claimed in claim 1, wherein the step of second determining includes the step of checking by the processor that the multilateration system position of the detection device has been calculated within the preceding 20 seconds.

11. A multi-mode position location method as claimed in claim 10, wherein if the multilateration system position of the detection device is not valid, there is further included the steps of:
 transmitting by the processor to the master control station a last known position of the detection device; and
 setting by the processor a flag indicating that the multilateration system position is out of date.

12. A multi-mode position location method for vehicles having detection devices in a simulated battlefield, the multi-mode position location method comprising the steps of:
 first determining by a processor whether a Global Positioning System (GPS) position of the detection device is valid;
 transmitting by a master control station to the processor differential GPS position corrections;
 first providing by the processor a differential corrected GPS position of the detection device to the master station, if the GPS position of the detection device is valid;
 second determining by the processor whether a multilateration system position of the detection device is valid, if the GPS position of the detection device is not valid; and
 second providing by the processor to the master control station the multilateration system position of the detection device, if the multilateration system position is valid.

13. A multi-mode position location method as claimed in claim 12, wherein the step of first determining includes the steps of:
 determining by a GPS receiver that the GPS receiver is tracking a sufficient number of satellites to produce a valid GPS position location; and
 determining by the GPS receiver that the geometry of the satellites is above a threshold to provide a valid GPS position location by the GPS receiver.

14. A multi-mode position location method as claimed in claim 13, wherein the step of second determining includes the steps of:
 providing by the master control station differential GPS position corrections to the processor, the processor transmitting the differential GPS position corrections to the GPS receiver; and
 third determining by the processor that the differential GPS position corrections are less than or equal to 30 seconds old.

15. A multi-mode position location method as claimed in claim 14, wherein there is further included the step of fourth determining by the processor whether the multilateration system position of the detector device is valid, if the GPS position of the detector device is not valid.

16. A multi-mode position location method as claimed in claim 15, wherein there is further included the steps of:
 the step of fourth determining includes the steps of:
 checking that the multilateration system position of the detection device has been calculated within the preceding 20 seconds; and
 transmitting by the processor to the master control station the multilateration system position of the detection device, if the multilateration system position was calculated within the preceding 20 seconds.

17. A multi-mode position location method as claimed in claim 15, wherein there is further included the step of transmitting by the processor to the master control station an autonomous GPS position, if the multilateration system position of the detection device is not valid, said autonomous GPS position being a GPS position of the detection device without the differential GPS position corrections.

18. A multi-mode position location method as claimed in claim 12, wherein the step of second determining includes the step of checking by the processor that the multilateration system position of the detection device has been calculated within the preceding 20 seconds.

19. A multi-mode position location method as claimed in claim 18, wherein if the multilateration system position is not valid, there is further included the steps of:
 transmitting by the processor to the master control station a last known position of the detection device; and
 setting by the processor a flag indicating that the multilateration system position is out of date.

20. A multi-mode position location method for carriers having detection devices in an area weapons effects simulation battlefield, the multi-mode position location method comprising the steps of:
 first determining by a processor whether a Global Positioning System (GPS) position of the detection device is valid;
 transmitting by a master control station to the processor differential GPS position corrections;
 first providing by the processor a differential corrected GPS position of the detection device to the master station, if the GPS position of the detection device is valid;
 second determining by the processor whether a multilateration system position of the detection device is valid, if the GPS position of the detection device is not valid; and
 second providing by the processor to the master control station the multilateration system position of the detection device, if the multilateration system position is valid;
 third providing by the processor to the master control station an autonomous GPS position of the detection device, if the differential corrected GPS position of the detection device is not valid and the multilateration system position of the detection device is not valid, the autonomous GPS position of the detection device being not differentially corrected.

* * * * *